(12) United States Patent
Unno

(10) Patent No.: US 6,876,515 B2
(45) Date of Patent: Apr. 5, 2005

(54) MONOLITHICALLY CONSTITUTED GASKET ASSEMBLY WITH COVER AND HARD DISK DRIVE UNIT

(75) Inventor: Takumi Unno, Shizuoka (JP)

(73) Assignee: Kokoku Intech Co., Ltd., Tokyo (JP)

( * ) Notice: Subject to any disclaimer, the term of this patent is extended or adjusted under 35 U.S.C. 154(b) by 88 days.

(21) Appl. No.: 10/617,344

(22) Filed: Jul. 10, 2003

(65) Prior Publication Data

US 2004/0012880 A1 Jan. 22, 2004

(30) Foreign Application Priority Data

Jul. 22, 2002 (JP) ...................................... 2002-212421

(51) Int. Cl.$^7$ .............................................. G11B 17/02
(52) U.S. Cl. ................................................... 360/97.02
(58) Field of Search ........................ 360/97.02, 97.03, 360/97.01

(56) References Cited

U.S. PATENT DOCUMENTS

| | | | | |
|---|---|---|---|---|
| 4,845,581 A | * | 7/1989 | Bronshvatch | ............ 360/97.01 |
| 5,097,978 A | * | 3/1992 | Eckerd | ................... 360/97.01 |
| 5,422,766 A | * | 6/1995 | Hack et al. | .............. 360/97.02 |
| 6,308,961 B1 | * | 10/2001 | Kunikane et al. | ........ 360/97.02 |
| 6,525,931 B2 | | 2/2003 | Yagenji et al. | .............. 361/685 |
| 6,631,049 B2 | * | 10/2003 | Satoh et al. | ............. 360/97.02 |
| 6,646,826 B1 | * | 11/2003 | Haidari et al. | ........... 360/97.02 |

FOREIGN PATENT DOCUMENTS

| | | |
|---|---|---|
| JP | 10-331981 | 12/1998 |
| JP | 11-44362 | 2/1999 |
| JP | 2001-311470 | 11/2001 |

* cited by examiner

Primary Examiner—Robert S. Tupper
(74) Attorney, Agent, or Firm—Carella Byrne Bain et al.; Elliott Olstein; William Squire

(57) ABSTRACT

A hard disk drive unit constituted in the following manner can prevent leaks of gas caused by a deformed gasket assembly, can enhance operational performances of the hard disk drive unit in accordance with using purposes and can be assembled more easily. A monolithically constituted gasket assembly with a cover for fitting to a case of the hard disk drive unit comprises: a cover plate constituting the cover made of aluminum, plastics and the like having piercing holes at predetermined positions; a gasket fitted to the cover plate via the piercing holes; and a ring constituting the cover arranged around an outer periphery of the gasket. A gap formed between the cover plate and the ring, and a gap formed between the cover plate and the case for the hard disk drive unit are sealed by the gasket.

2 Claims, 2 Drawing Sheets

MONOLITHICALLY CONSTITUTED GASKET ASSEMBLY WITH COVER AND HARD DISK DRIVE UNIT

BACKGROUND OF THE INVENTION

1. Field of the Invention

The present invention relates to a monolithically constituted gasket assembly with a cover for fitting to a case of a hard disk drive unit and relates to the hard disk drive unit.

2. Brief Description of the Related Art

A hard disk drive unit is employed as a memory device by a computer and the like and comprises active components such as magnetic disks, magnetic heads, a disk driving unit, a controller and the like, which are accommodated in a gas-tight space formed by a case and its cover. A gasket is employed so as to keep the case of the hard disk drive unit in a gas-tight state.

FIG. 3 is a cross-sectional view illustrating a rough arrangement constituted by a case and a cover usually employed by the above-mentioned hard disk drive unit. An elastic gasket 12 is arranged inside and outside of a cover 11 so as to pierce through the cover 11 so that a gasket assembly is monolithically constituted with the cover. The monolithically constituted gasket assembly is fitted to a case 13 of the hard disk drive unit.

However, in a conventional hard disk drive unit which employs the monolithically constituted gasket assembly, gas apt to leak via pierced holes in directions A and B, which gives bad effects on operating performances of the hard disk drive unit.

Such leaks of gas are caused, when the gasket 12 is deformed by a compressing force between the cover 11 and the case 13. When an object 14 is moved in a direction C as illustrated in FIG. 4A, corresponding portion of the gasket 12 is cut by the object 14, consequently, a gap is formed. When the gasket 12 is tilted as illustrated in FIG. 4B, it is deformed so that a gap is also formed.

SUMMARY OF THE INVENTION

The present invention is carried out in view of solving the problems mentioned above in order to provide a monolithically constituted gasket assembly with a cover and a hard disk drive unit equipped with such gasket capable of preventing leaks of gas caused by a deformed gasket, improving operating performances in accordance with using purposes and being assembled easily.

A monolithically constituted gasket assembly with a cover for fitting to a case of a hard disk drive unit by the present invention comprises: a cover plate constituting the cover having piercing holes at predetermined positions; a gasket fitted to the cover plate via the piercing holes; and a ring constituting the cover arranged around an outer periphery of the gasket. A gap formed between the cover plate and the ring, and a gap formed between the cover plate and the case for the hard disk drive unit are sealed by the gasket.

A hard disk drive unit by the present invention of which active components are accommodated in a case, wherein: a monolithically constituted gasket assembly with a cover for fitting to the case comprises a cover plate constituting the cover having piercing holes at predetermined positions, a gasket fitted to the cover plate via the piercing holes and a ring constituting the cover arranged around an outer periphery of the gasket. A gap formed between the cover plate and the ring, and a gap formed between the cover plate and the case for the hard disk drive unit are sealed by the gasket.

DETAILED DESCRIPTION OF THE PREFERRED EMBODIMENTS

Figure 1:
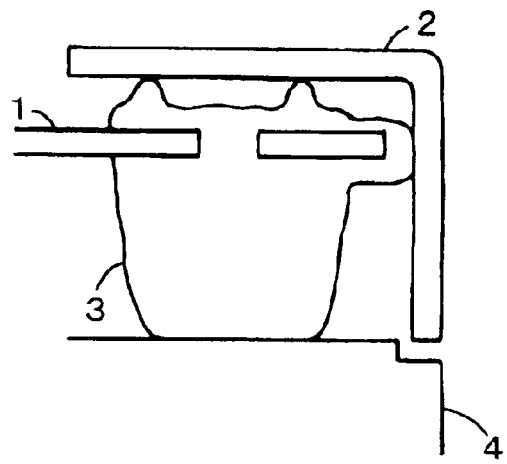
FIG. 1 is a cross-sectional view illustrating an arrangement of an embodiment by the present invention.

Hereinafter, the embodiment by the present invention is explained as referring to the drawings.

FIG. 1 is the cross-sectional view illustrating the arrangement of the monolithically constituted gasket assembly with the cover by the embodiment of the present invention. In the monolithically constituted gasket assembly, a cover consists of two parts, namely, a cover plate 1 made of aluminum, plastics and the like, and a ring 2 made of iron, steel and the like arranged around outer periphery of the cover plate 1. A gasket 3 made of rubber and the like, is pierced through holes formed at predetermined positions of the cover plate 1, so that the gasket 3 seals a gap between the cover plate 1 and the ring 2 and also seals another gap between cover plate 1 and a case 4 of the hard disk drive unit.

As shown in FIG. 1, a portion of the gasket 3 extends outward beyond the cover plate 1 so as to contact to the inner surface of the ring 3. Due to this extending portion of the gasket, the cover plate 1, the ring 2 and the gasket 3 form a monolithically constituted gasket assembly, when the cover plate 1 is pushed into the ring 2. Consequently, the hard disk drive unit can be easily assembled.

In the monolithic gasket assembly constituted in the above-mentioned way, since a cover assembly consisting of the cover plate and the ring has a double structure, the gasket 3 is prevented from deforming, consequently, leaks of gas can be prevented. The monolithically constituted gasket assembly also can enhance operational performances of the hard disk drive unit in accordance with using purposes. Since the monolithically constituted gasket assembly does not require adhesives for fitting, the hard disk drive unit can be easily assembled.

Figure 2A:
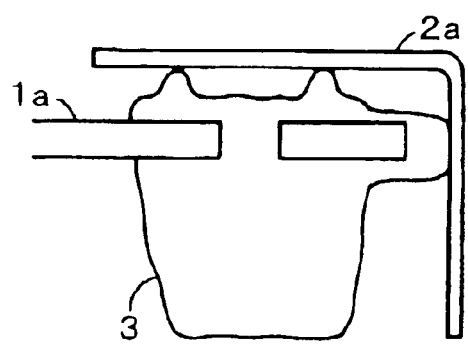
FIGS. 2A, 2B and 2C are cross-sectional views illustrating different types of monolithically constituted gasket assemblies with covers by the embodiment of present invention.
Figure 2B:
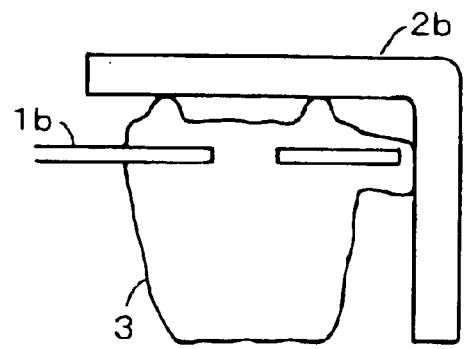
Figure 2C:
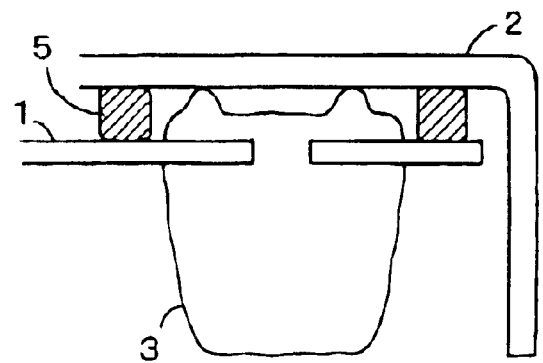
Figure 3:
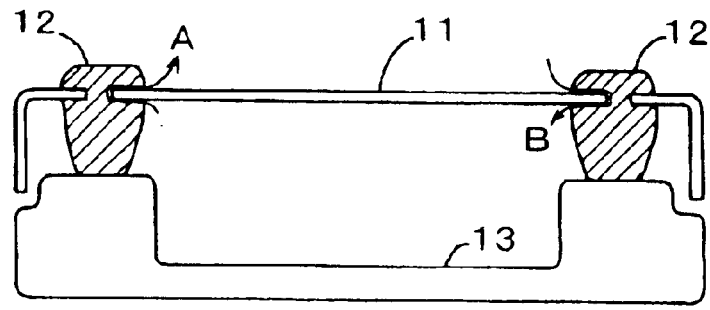
FIG. 3 is a cross-sectional view illustrating a rough arrangement constituted by a case and a cover in a conventional hard disk drive unit.
Figure 4A:
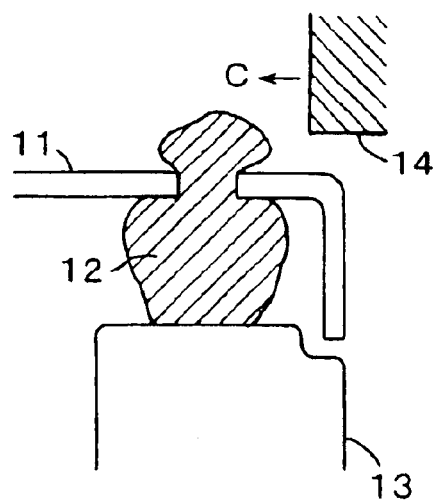
FIGS. 4A and 4B are cross-sectional views for explaining deformed statuses of the conventional gasket.
Figure 4B:
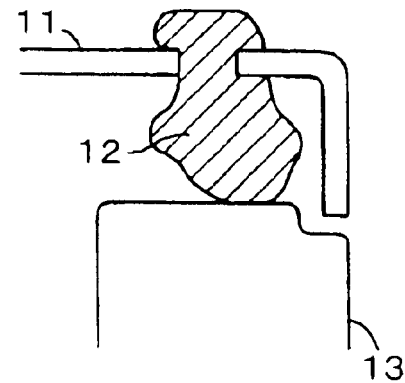

FIGS. 2A, 2B and 2C are cross-sectional views illustrating different types of monolithically constituted gasket assemblies by the present embodiment. FIG. 2A shows an example of the monolithic gasket assemblies constituted by a thick cover plate 1a and a thin ring 2a and FIG. 2B shows another example of the monolithic gasket assemblies constituted by a thin cover plate 1b and thick ring 2b. Further FIG. 2C shows other example, where a damping material 5 also functioning as an adhesive such as a paste or the like is arranged between the cover plate 1 and the ring 3 around the gasket 3.

Thus materials for monolithically constituted gasket assemblies can be selected in accordance with using purposes so that functions such as a damping ability, sound-proof ability, sealing ability and rigidity of the gasket assembly can be improved and weight reduction in the assemblies can be attained.

As explained above, monolithically constituted gasket assembly by the present embodiment attain effects of preventing leaks of gas caused by the deformed gasket assembly, enhancing operational performances of the hard disk drive unit in accordance with using purposes and assembling the hard disk drive unit more easily.

What is claimed is:

1. A monolithically constituted gasket assembly with a cover for fitting to a case of a hard disk drive unit comprising:

a cover plate constituting said cover having piercing holes at predetermined positions;

a gasket fitted to said cover plate via said piercing holes; and a ring constituting said cover arranged around an outer periphery of said gasket, wherein:

a gap formed between said cover plate and said ring, and a gap formed between said cover plate and said case for the hard disk drive unit are sealed by said gasket.

2. A hard disk drive unit of which active components are accommodated in a case, wherein:

a monolithically constituted gasket assembly with a cover for fitting to the case comprises a cover plate constituting said cover having piercing holes at predetermined positions, a gasket fitted to said cover plate via said piercing holes and a ring constituting said cover arranged around an outer periphery of said gasket, wherein:

a gap formed between said cover plate and said ring, and a gap formed between said cover plate and said case for the hard disk drive unit are sealed by said gasket.

* * * * *